(No Model.)
O. C. HALL.
WAGON AXLE.
No. 374,301. Patented Dec. 6, 1887.
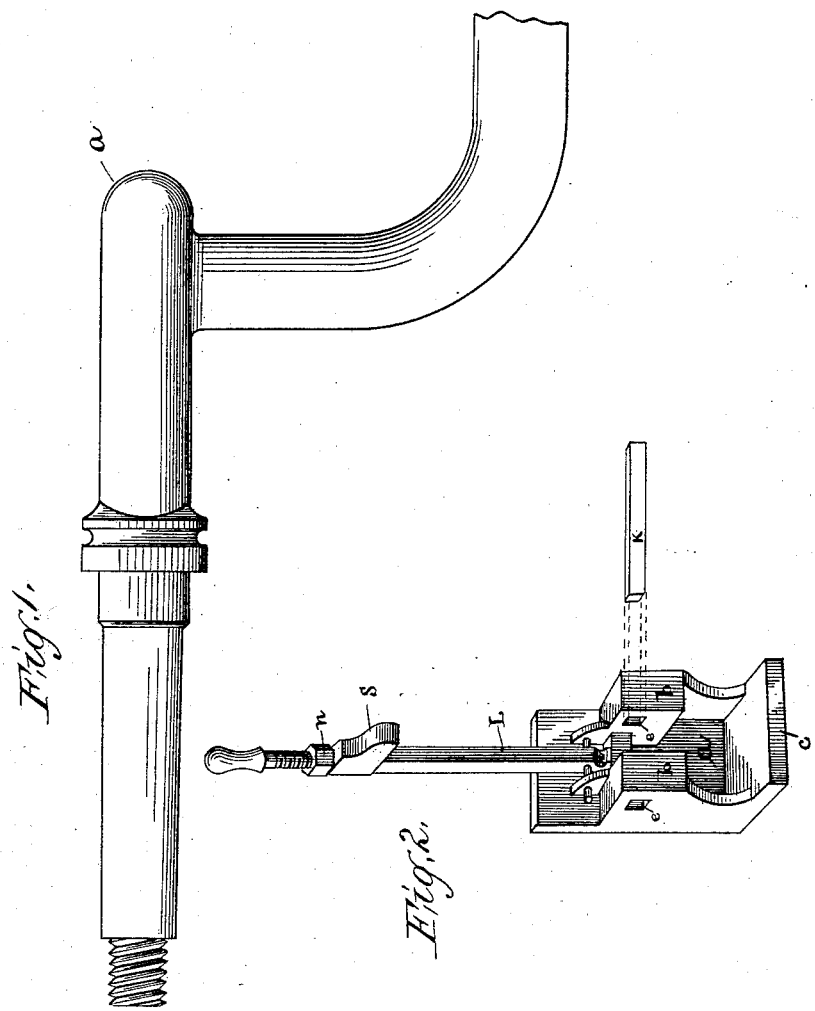
WITNESSES:
INVENTOR:
O. Clifford Hall
BY
John R. Bennett
his ATTORNEYS.

UNITED STATES PATENT OFFICE.

O. CLIFFORD HALL, OF WILKES-BARRÉ, PENNSYLVANIA.

WAGON-AXLE.

SPECIFICATION forming part of Letters Patent No. 374,301, dated December 6, 1887.

Application filed October 12, 1887. Serial No. 252,119. (No model.)

*To all whom it may concern:*

Be it known that I, O. CLIFFORD HALL, a citizen of the United States, and a resident of Wilkes-Barré, in the county of Luzerne and State of Pennsylvania, have invented certain new and useful Improvements in Wagon and Carriage Axles, of which the following is a specification.

The object of my invention is to provide a cranked axle formed from one solid bar without a weld and having a projection beyond the downward sweep of sufficient width to allow the springs to be shackled thereon.

One form of my invention is shown in the accompanying drawings, in which—

Figure 1 represents a cranked axle made from a solid bar without welding, with the projection $a$ beyond the downward sweep of crank, to which is shackled the wagon or carriage spring. Fig. 2 represents the machine in which the cranking is done.

Same letters indicate similar parts in the different drawings.

To form the cranked axle of the peculiar construction shown in Fig. 1, an axle is placed between the projections $b\ b$, Fig. 2, the bed of the axle being parallel to the lever L, and the end of the spindle rests upon the plate $c$ at the bottom of the machine. The bar K, over which the axle is to be bent, is then passed through the slots $e\ e$ in the projections $b\ b$, and the lever L is brought forward, pressing against the axle and bending it over the bar K to the desired distance. The lever L is provided with a slide, S, adjustable by means of the nut $n$, which presses against the end of the axle, thus forcing a portion of the axle into the recess $r$, provided in the lever, and forming the projection $a$. The axle is then placed under suitably-constructed dies in the hammer and the sides smoothed down.

I am aware that cranked axles have been formed with a projection welded on, and also with a downward sweep of the bed welded onto the straight portion at a point to leave the projection; but never to my knowledge has a cranked axle been formed from one solid bar without a weld in such a way as to have a projection beyond the downward sweep of the bed.

I claim—

A cranked axle formed in a solid bar without welding and provided with a projection beyond the downward sweep of the bed of sufficient width to allow the spring to be shackled thereon, substantially as shown and described.

O. CLIFFORD HALL.

Witnesses:
 JNO. MCCREERY,
 C. H. GILLAM.